US00RE44770E

(19) United States
(12) Reissued Patent
Nichols et al.

(10) Patent Number: US RE44,770 E
(45) Date of Reissued Patent: Feb. 25, 2014

(54) OUTDOOR GRILL

(75) Inventors: Dan Nichols, Huntington Beach, CA (US); David Deary, Corona, CA (US); Randy L. Rummel, Huntington Beach, CA (US)

(73) Assignee: Dynamic Cooking Systems, Inc., Huntington Beach, CA (US)

(21) Appl. No.: 29/261,486

(22) Filed: Jun. 14, 2006
(Under 37 CFR 1.47)

Related U.S. Patent Documents

Reissue of:
(64) Patent No.: Des. 491,414
Issued: Jun. 15, 2004
Appl. No.: 29/180,132
Filed: Apr. 17, 2003

(51) LOC (10) Cl. ..... 07-02
(52) U.S. Cl.
USPC ..... D7/402
(58) Field of Classification Search
USPC ..... D7/332–338, 402–405; 126/25 R, 25 A, 126/25 AA, 41 R, 27, 28, 4, 9 R; 99/421 R, 99/421 H, 421 M, 395
See application file for complete search history.

(56) References Cited

U.S. PATENT DOCUMENTS

| | | | |
|---|---|---|---|
| 1,748,742 | A | 2/1930 | Thompson et al. |
| D105,114 | S | 6/1937 | Burrow |
| 2,480,045 | A | 8/1949 | Reeves |
| 2,654,359 | A | 10/1953 | Reeves |
| 2,766,683 | A | 10/1956 | Kanz |

(Continued)

FOREIGN PATENT DOCUMENTS

| | | |
|---|---|---|
| FR | 2614677 | 11/1988 |

OTHER PUBLICATIONS

Frigidaire electric & gas ranges catalog, copyright Mar. 1999. Frigidaire self-cleaning electric range.

(Continued)

*Primary Examiner* — Phillip S Hyder
(74) *Attorney, Agent, or Firm* — Knobbe, Martens, Olson & Bear LLP

(57) CLAIM

The ornamental design for outdoor grill, as shown and described.

DESCRIPTION

FIG. 1 is a top, front and left side perspective view of an outdoor grill showing our new design;
FIG. 2 is a top, front and right side perspective view thereof;
FIG. 3 is a right side elevation view thereof;
FIG. 4 is a left side elevation view thereof;
FIG. 5 is a top plan view thereof;
FIG. 6 is a front elevation view thereof;
FIG. 7 is a back elevation view thereof;
*FIG. 8 is a top, front and left side perspective view of an outdoor grill showing our new design;*
*FIG. 9 is a top, front and right side perspective view thereof;*
*FIG. 10 is a right side elevation thereof;*
*FIG. 11 is a left side elevation thereof;*
*FIG. 12 is a top plan view thereof;*
*FIG. 13 is a front elevation view thereof; and,*
*FIG. 14 is a back elevation view thereof.*
The [portion of the grill] *details* shown in broken lines [in FIGS. 1-4 and 6 (that is hidden when installed) is shown for illustrative purposes only and forms] *form* no part of the claimed design.

1 Claim, 14 Drawing Sheets

Figure 1:
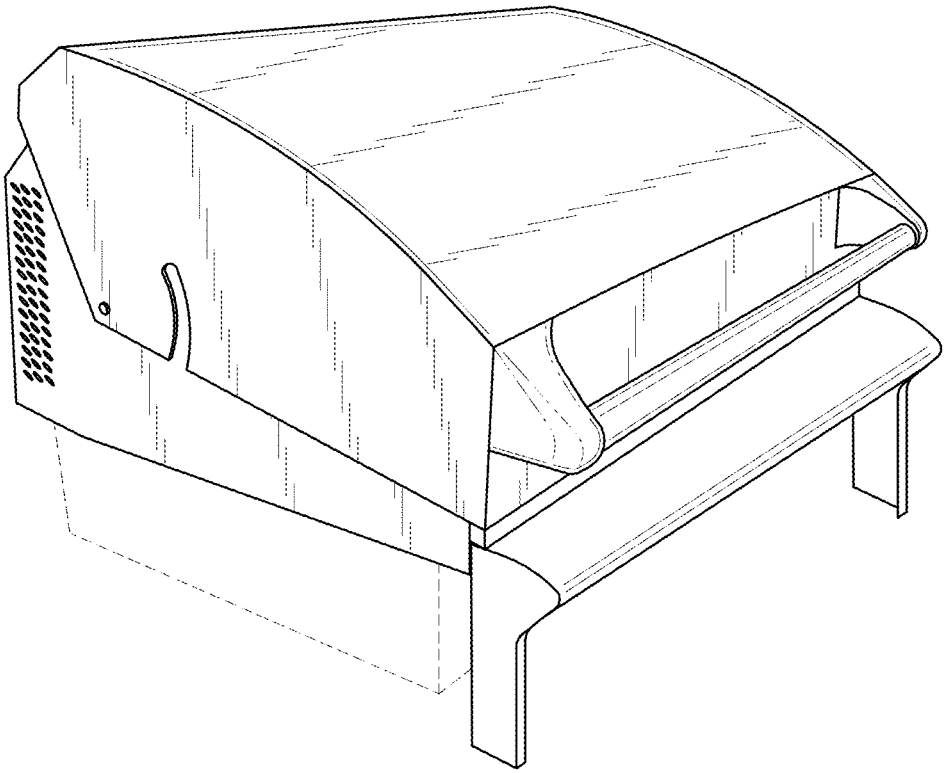
Figure 2:
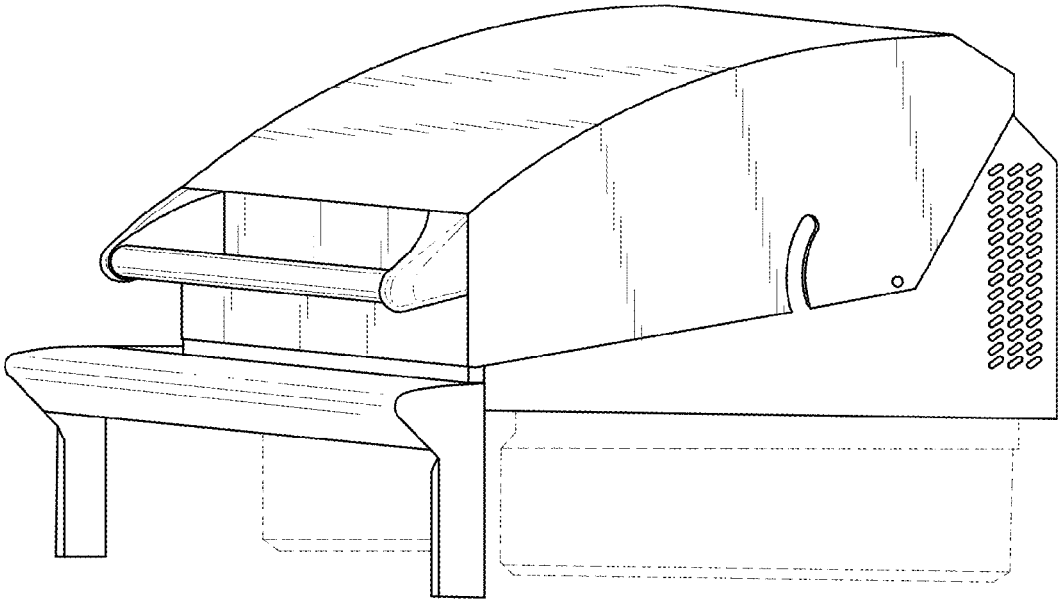
Figure 3:
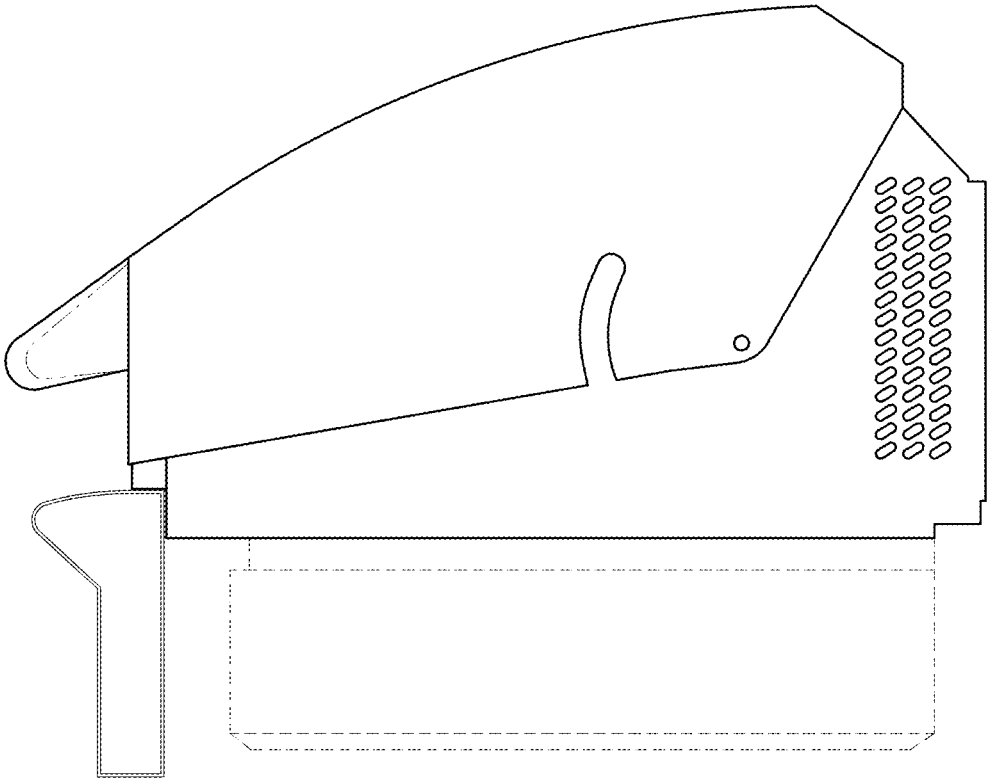
Figure 4:
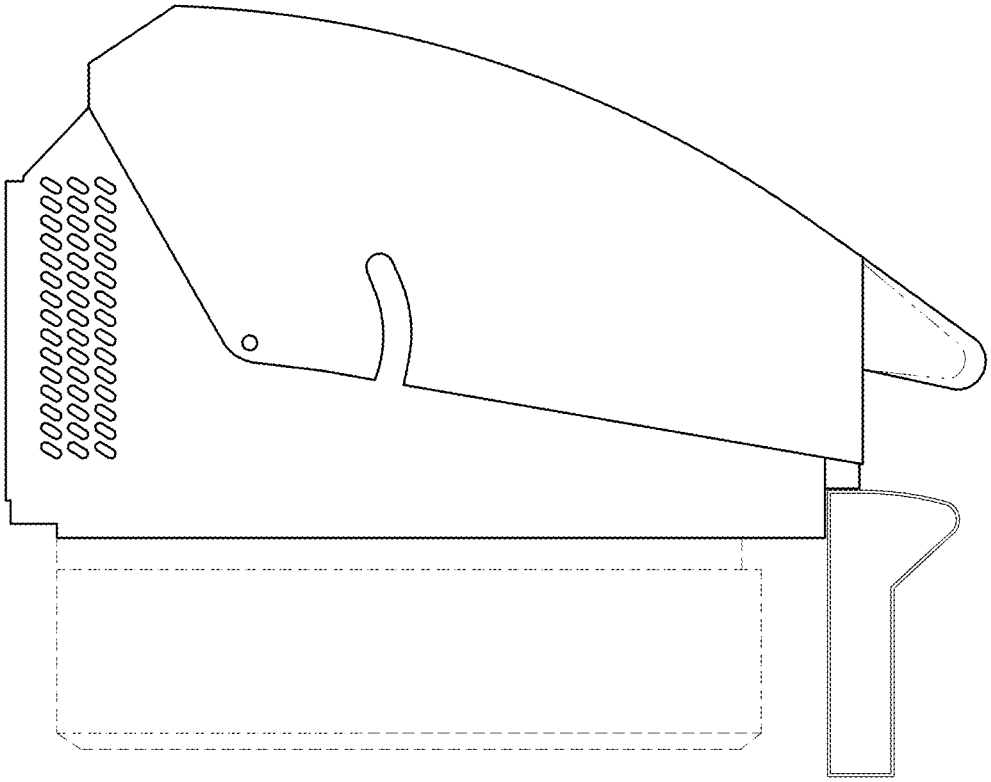
Figure 5:
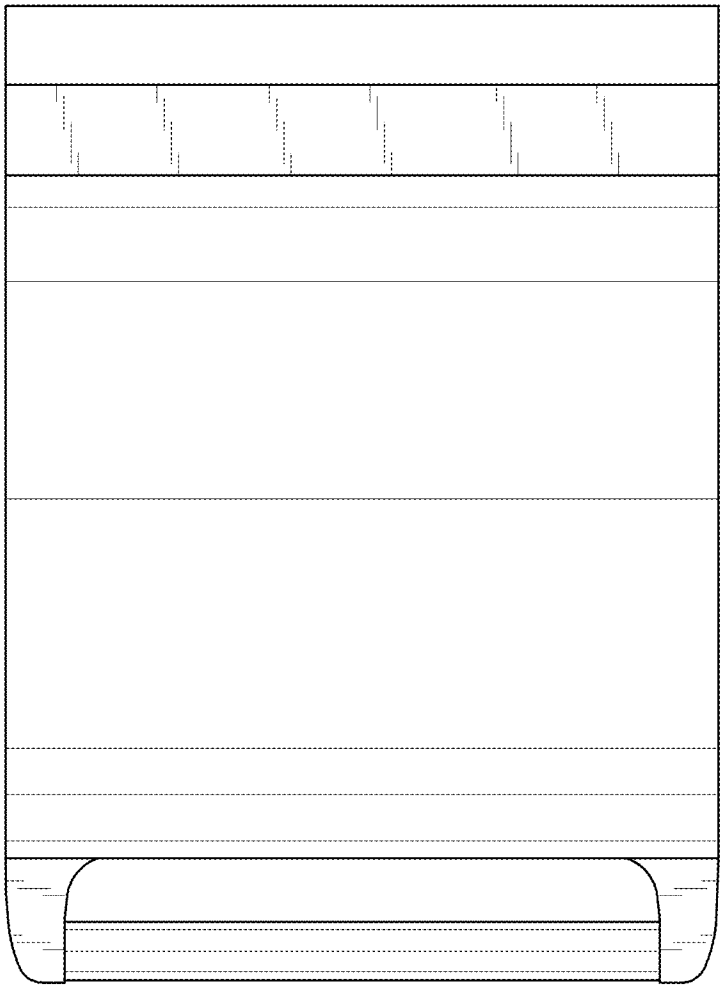
Figure 6:
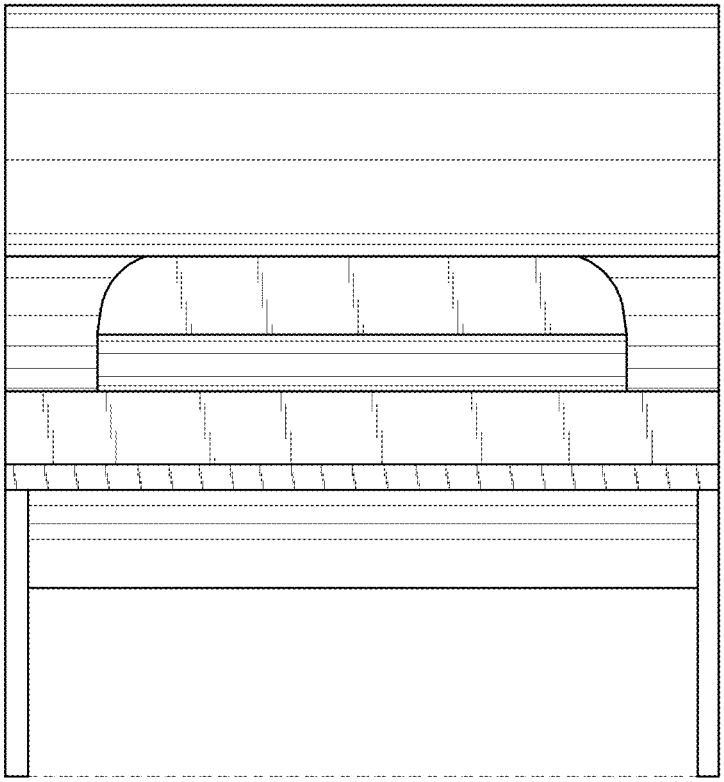
Figure 7:
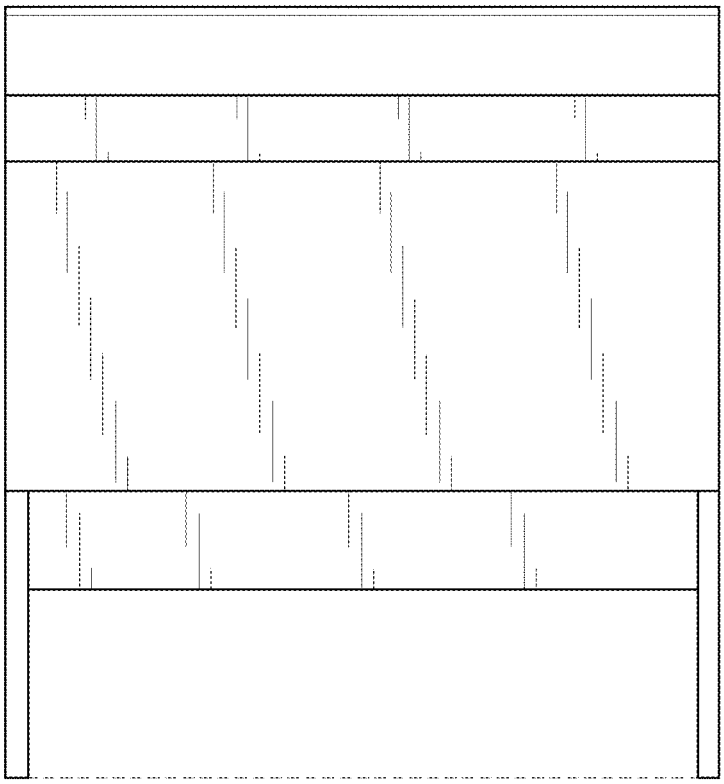

Matter enclosed in heavy brackets [ ] appears in the original patent but forms no part of this reissue; matter printed in italics indicates the additions made by reissue.

*NEW*

(56) References Cited

U.S. PATENT DOCUMENTS

| | | | |
|---|---|---|---|
| 2,823,657 | A | 2/1958 | Brodbeck |
| 2,973,524 | A | 3/1961 | Daniels |
| D201,938 | S | 8/1965 | Tecton |
| D201,939 | S | 8/1965 | Tecton |
| 3,923,037 | A | 12/1975 | Donato |
| D289,487 | S | 4/1987 | Schultz |
| D293,070 | S | 12/1987 | Cerola |
| 4,971,024 | A | 11/1990 | Albon et al. |
| 5,038,748 | A | 8/1991 | Lockwood et al. |
| 5,046,477 | A | 9/1991 | Bennett et al. |
| D326,029 | S | 5/1992 | Lok |
| D333,234 | S | 2/1993 | Nichols |
| D334,866 | S | 4/1993 | Warren |
| D342,641 | S | 12/1993 | Falk |
| 5,372,121 | A | 12/1994 | Castillo et al. |
| D369,062 | S | 4/1996 | Holbrook, Jr. |
| 5,536,518 | A | 7/1996 | Rummel |
| D372,630 | S | 8/1996 | Lewis et al. |
| D378,262 | S | 3/1997 | Sparks |
| 5,755,154 | A | 5/1998 | Schroeter et al. |
| D421,694 | S | 3/2000 | Kitabayashi et al. |
| D430,451 | S | 9/2000 | Bordel |
| 6,257,288 | B1 | 7/2001 | Braccini |
| D458,803 | S | 6/2002 | Becker et al. |
| D461,090 | S | 8/2002 | Rummel et al. |
| D461,359 | S | 8/2002 | Coleman et al. |
| D466,756 | S | 12/2002 | Bossler et al. |
| D467,461 | S | 12/2002 | Jones et al. |
| D470,357 | S | 2/2003 | Home |
| D471,057 | S | 3/2003 | Chung |
| D472,756 | S | 4/2003 | Pai |
| D473,096 | S | 4/2003 | Resuello et al. |
| D475,235 | S | 6/2003 | Home |
| D479,092 | S | 9/2003 | Lewis et al. |
| D481,589 | S | 11/2003 | Becker et al. |
| D486,350 | S | 2/2004 | Nichols |
| D486,690 | S | 2/2004 | Becker et al. |
| 6,712,066 | B1 | 3/2004 | Atkinson et al. |
| D491,414 | S | 6/2004 | Nichols et al. |

OTHER PUBLICATIONS

Thermador "Create" catalog, copyright 1999. pp. 13, 48 "Gas surface/electric range", bottom left.

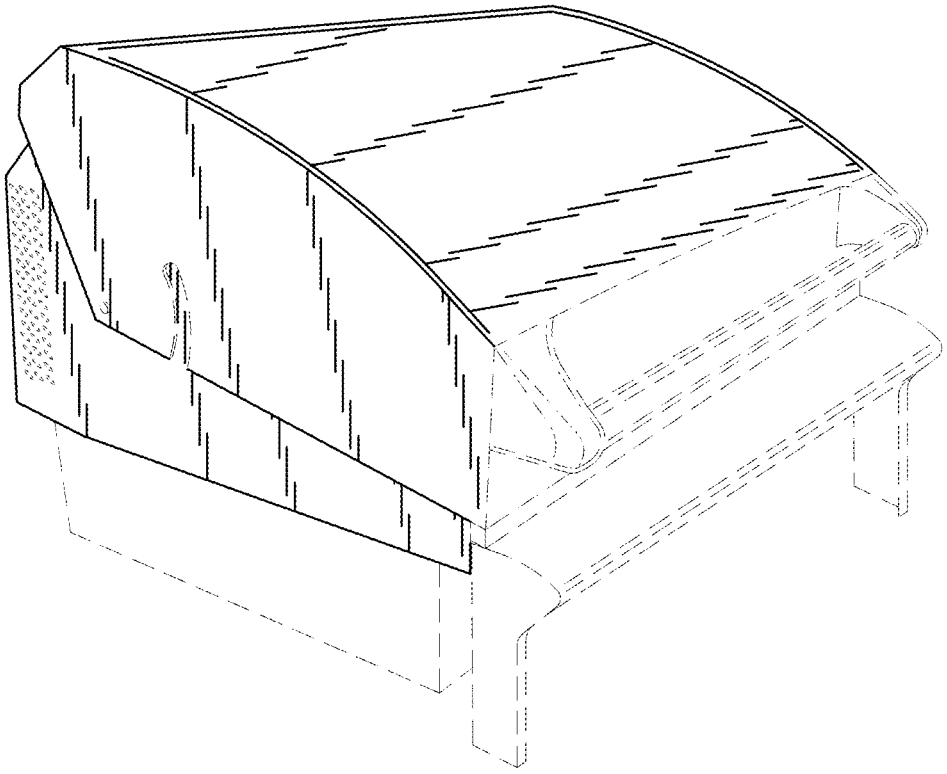
FIG. 8
NEW

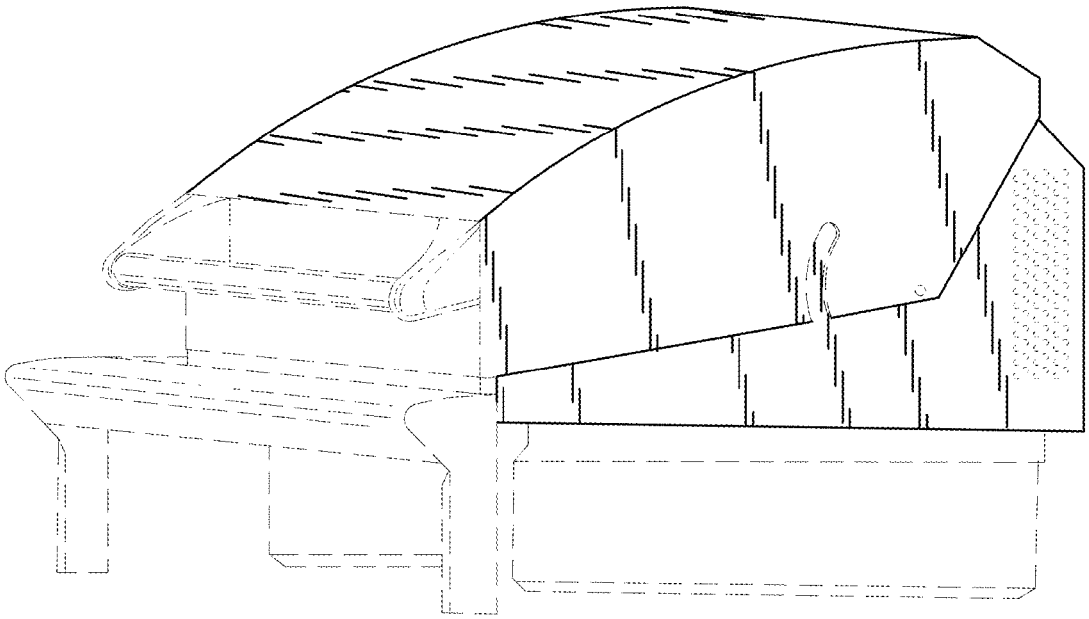
FIG. 9
NEW

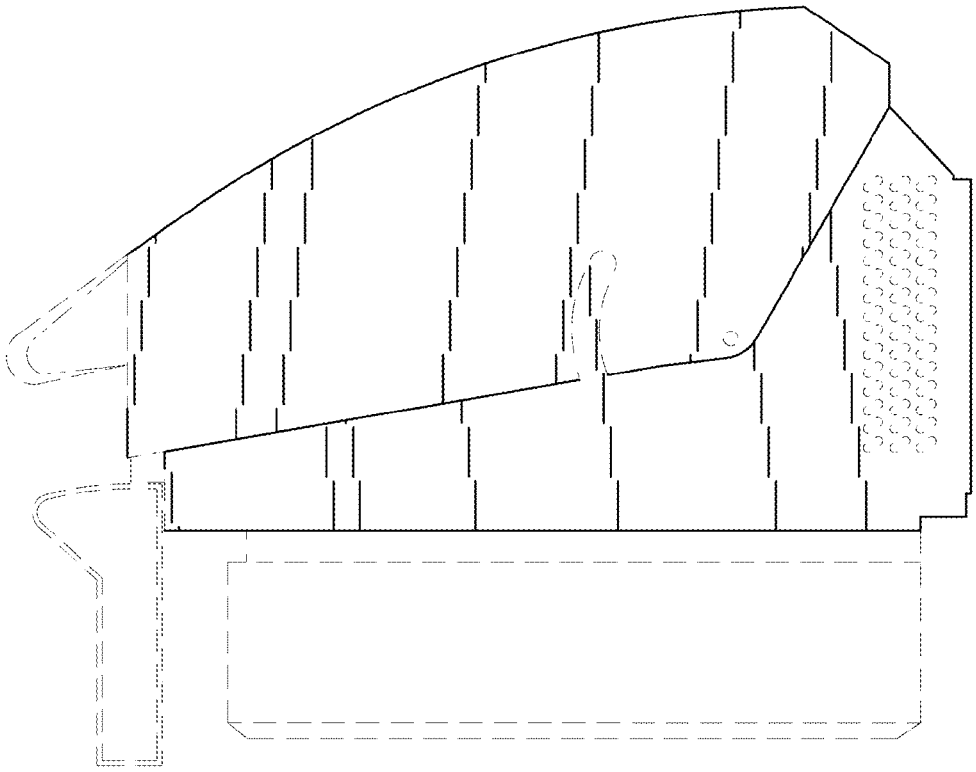
FIG. 10
NEW

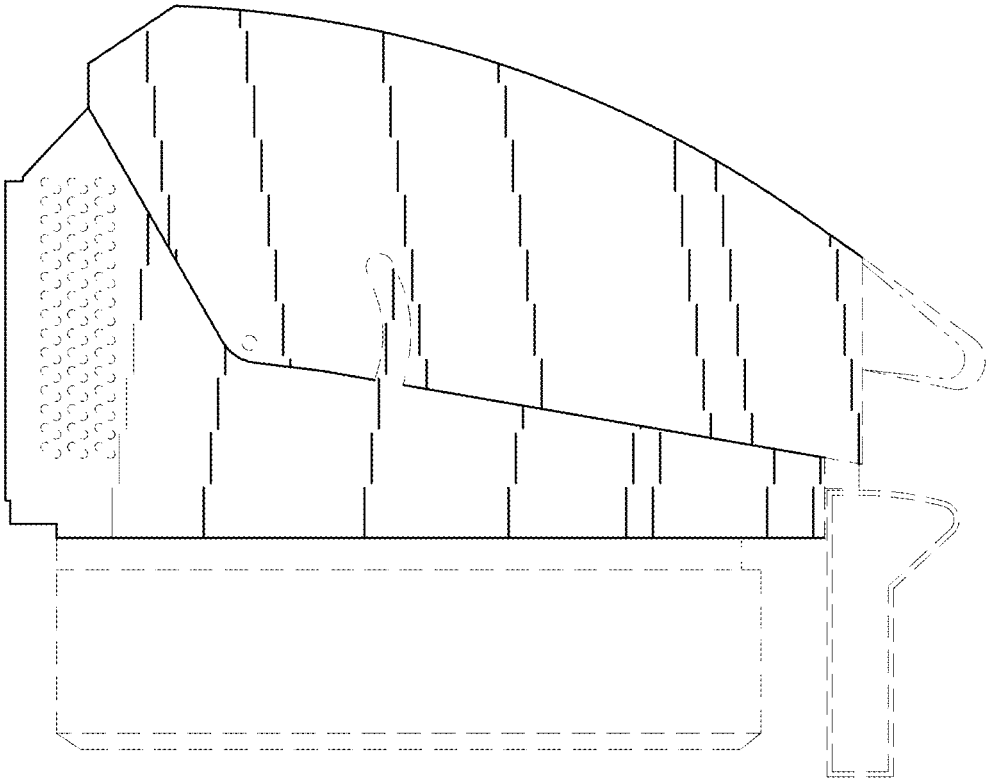
FIG. 11
NEW

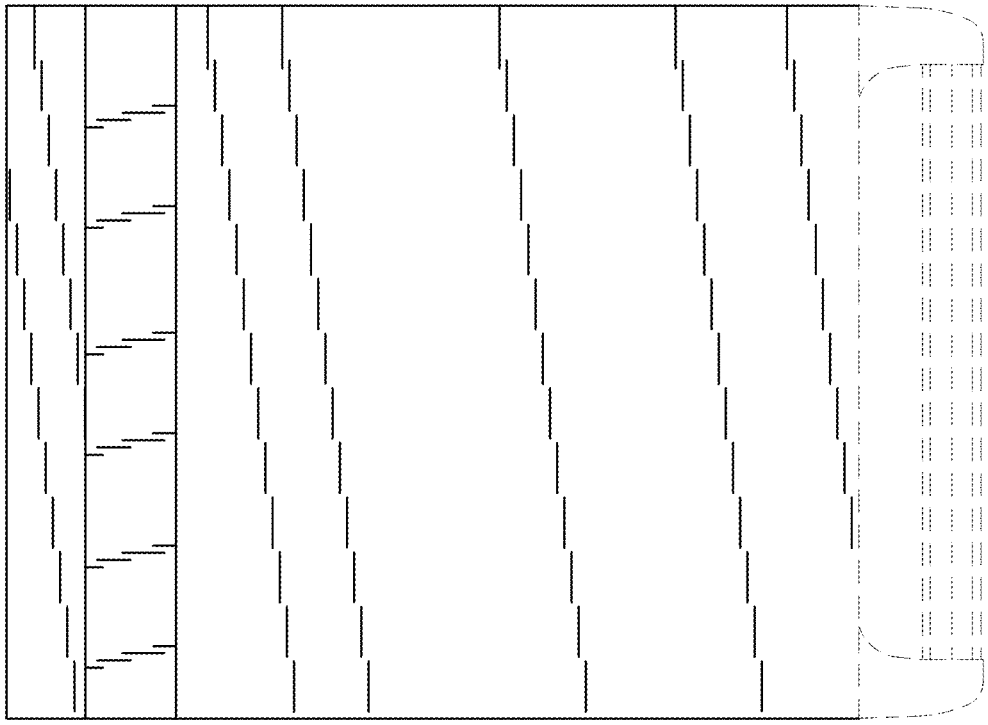
FIG. 12
NEW

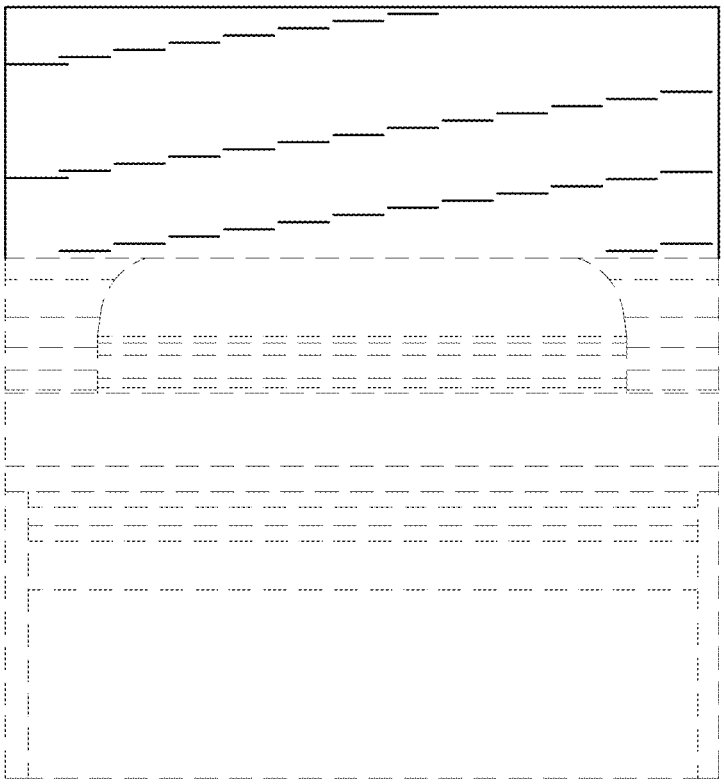
FIG. 13
NEW

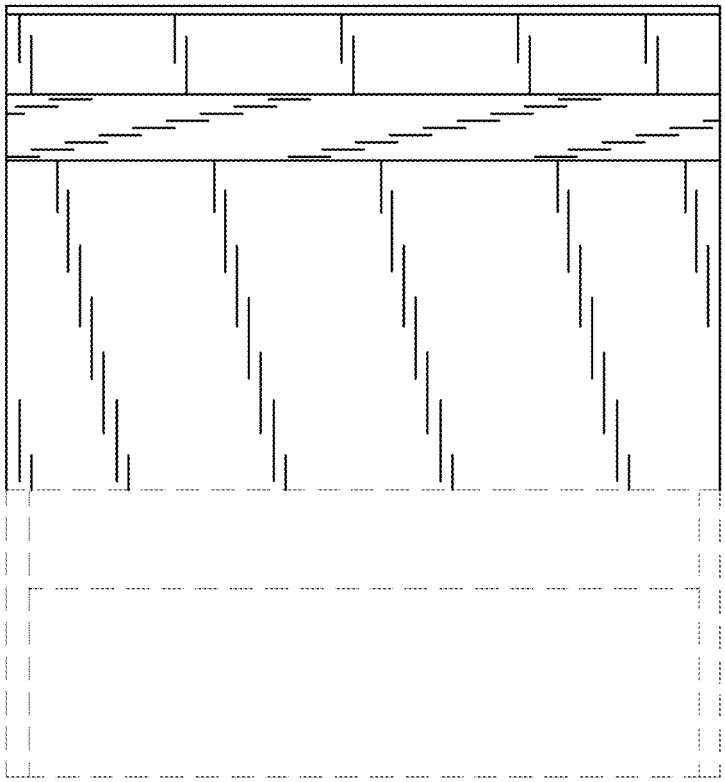
FIG. 14
NEW